United States Patent [19]

Taniguchi et al.

[11] Patent Number: 4,982,299
[45] Date of Patent: Jan. 1, 1991

[54] LINEAR MOTOR LOCKING MECHANISM IN A DISC UNIT

[75] Inventors: Shoji Taniguchi; Masahiro Horii, both of Nara; Akio Horiguchi, Tenri; Tetsuyuki Takemoto, Nara, all of Japan

[73] Assignee: Sharp Kabushiki Kaisha, Osaka, Japan

[21] Appl. No.: 368,650

[22] Filed: Jun. 20, 1989

[30] Foreign Application Priority Data

Jun. 22, 1988 [JP] Japan .................... 63-82551[U]

[51] Int. Cl.$^5$ .................................................. G11B 17/04
[52] U.S. Cl. ................................ 360/105; 360/99.06
[58] Field of Search ............... 360/105, 106, 99.02, 360/99.03, 99.06, 99.07; 369/256

[56] References Cited

U.S. PATENT DOCUMENTS 4,870,518 9/1989 Thompson et al. .............. 360/99.06

FOREIGN PATENT DOCUMENTS

| 0215768 | 12/1983 | Japan | 360/105 |
| 62-150776 | 9/1987 | Japan. | |
| 63-193389 | 8/1988 | Japan. | |
| 2125203 | 2/1984 | United Kingdom | 360/99.06 |

Primary Examiner—David J. Severin

[57] ABSTRACT

A linear motor is movably disposed in a disc unit internally provided with a cartidge holder for loading and ejecting a disc cartridge and is securely locked by a locking mechanism at the time of ejection of the cartridge. The locking mechanism comprises a first locking member extending downwards from the cartridge holder and a second locking member securely mounted on the linear motor. When the disc cartridge is ejected by the cartridge holder, the first locking member is brought into contact with the second locking member to move the linear motor toward a location at which the linear motor is securely locked.

2 Claims, 2 Drawing Sheets

0
LINEAR MOTOR LOCKING MECHANISM IN A DISC UNIT

BACKGROUND OF THE INVENTION

1. Field of the Invention

The present invention relates to a linear motor locking mechanism in a disc unit employing therein a photomagnetic disc or the like. Such a mechanism can prevent an optical pickup mounted on the linear motor from being damaged by making the linear motor unmoved when the disc unit is moved.

2. Description of the Prior Art

A linear motor movably disposed in a disc unit is usually kept unmoved when the disc unit is moved from one location to another. If the linear motor is left free without being locked, it would occasionally strike a frame. Accordingly, there is the danger of destroying an optical pickup provided on the linear motor.

FIGS. 1 and 2 depict conventional mechanisms for locking the linear motor.

In the mechanism as shown in FIG. 1, a locking bar 2 for exclusive use is inserted into a disc unit 1 from behind and pushes a linear motor 3 accommodated in the disc unit 1 against a frame 4 to lock it.

The mechanism of FIG. 2 employs a locking cartridge 6 provided with biasing member 5. In this mechanism, when the locking cartridge 6 is brought into operation, the biasing member 5 depresses the linear motor 3 from above to lock it.

Furthermore, a mechanism (not shown) employing an electric actuator such as a solenoid or the like has been proposed, in which the actuator is brought into contact with the linear motor to lock it when a power source is switched off.

However, these mechanisms inevitably require the lock bar 2 for exclusive use, the locking cartridge 6 or the like, thereby increasing the number of parts. Accordingly, such mechanisms are disadvantageous in that they are relatively costly and troublesome in management. Besides, the conventional mechanism include the danger of damaging the disc unit by switching on the power source when the linear motor is locked.

SUMMARY OF THE INVENTION

Accordingly, the present invention has been developed with a view to substantially eliminate the above described disadvantages inherent in the prior art mechanism for locking a linear motor, and has for its essential object to provide an improved mechanism which is capable of locking the linear motor without the use of any specialized locking member and never permits the linear motor to be in an unlocked condition at the time of ejection of a disc cartridge.

Another important object of the present invention is to provide a locking mechanism of the above described type which is simple in construction and stable in functioning, and can be readily incorporated into a disc unit.

In accomplishing these and other objects, the locking mechanism according to one preferred embodiment of the present invention can lock a linear motor movably disposed in a disc unit which is internally provided with a loading device for loading and ejecting a disc cartridge, and is characterized in that a first locking member extending downwards from the loading device, when the disc cartridge is ejected by the loading device, is brought into contact with a second locking member securely mounted on the linear motor to move the linear motor towards a location at which the linear motor is locked.

By the above described construction, the linear motor is securely locked inside the disc unit at the time of ejection of the cartridge without help of any locking part for exclusive use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and which are given by way of illustration only, and thus are not limitative of the present invention, and wherein.

DETAILED DESCRIPTION OF THE PREFERRED EMBODIMENTS

Figure 1:
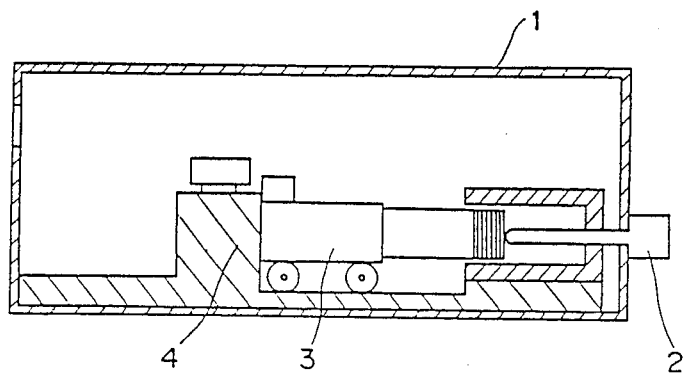
FIG. 1 is a schematic sectional view of a disc unit provided with a conventional mechanism for locking a linear motor movably disposed therein.
Figure 2:
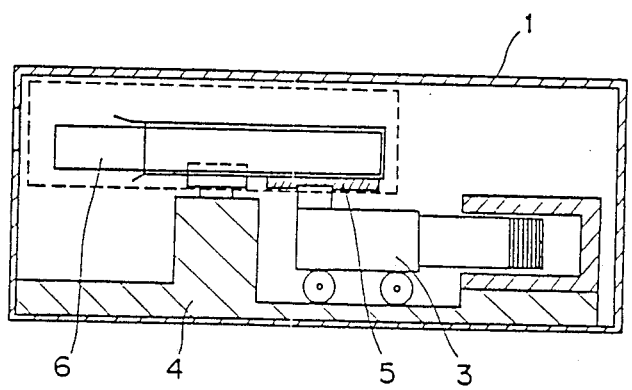
FIG. 2 is a view similar to FIG. 1, indicative of another conventional locking mechanism.
Figure 3:
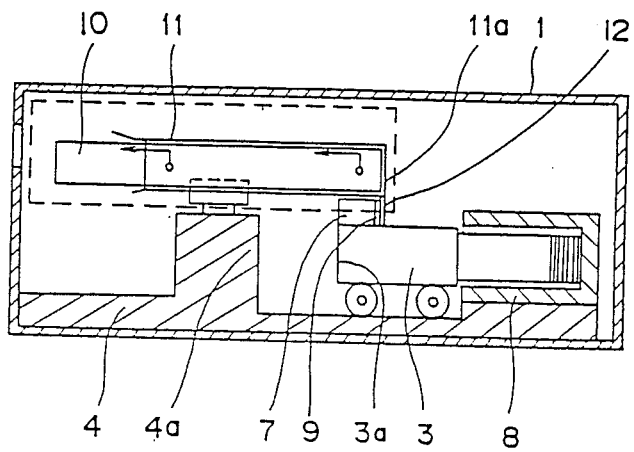
FIG. 3 is a schematic sectional view of the disc unit accommodating a linear motor locking mechanism according to one preferred embodiment of the present invention.

FIG. 3 depicts a disc unit 1 internally provided with a linear motor locking mechanism according to one preferred embodiment of the present invention. The disc unit 1 accommodates a frame 4 fixedly mounted therein, a linear motor 3 movably disposed on the frame 4, an optical pickup 7 securely mounted on the upper surface of the linear motor 3, a magnetic circuit 8 fixedly mounted on the frame 4 behind the linear motor 3 and a cartridge holder 11 movably disposed above the frame 4. The linear motor 3 is provided on its upper surface behind the optical pickup 7 with a locking member 9. A disc cartridge 10 is loaded in and ejected from the disc unit 1 by the cartridge holder 11, which is provided on its rear side with a locking member 12 extending downwards therefrom.

As shown in FIG. 3, when the disc cartridge 10 is loaded in the disc unit 1 by the cartridge holder 11 and properly positioned therein, the locking member 12 thereof is located behind and in contact with the locking member 9 of the linear motor 3.

Figure 4:
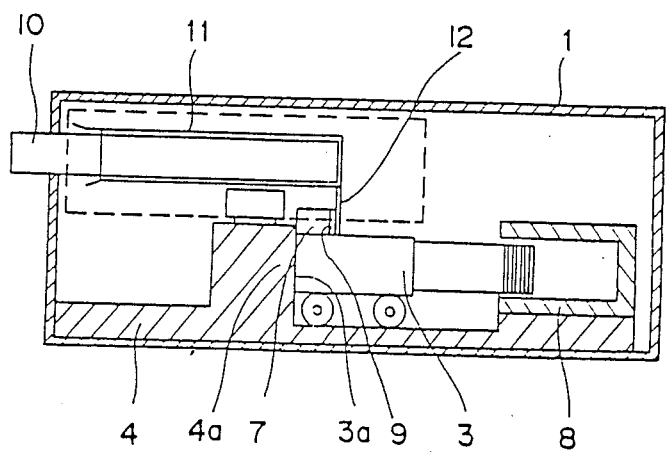
FIG. 4 is a view similar to FIG. 3, which particularly shows an activated condition of the mechanism of FIG. 3.

In the above described construction, when the disc cartridge 10 is ejected from the disc unit 1, the cartridge holder 11 advances outwards. In this event, the locking member 12 which extends downwards from the rear end of the cartridge holder 11 and is in contact with the locking member 9 of the linear motor 3 advances the linear motor 3. When the cartridge holder 11 has reached a ejection position at which it can eject the disc cartridge 10 from the disc unit 1, the front surface 3a of the linear motor 3 is brought into contact with a surface of the frame 4 confronting it, as shown in FIG. 4. In this event, a portion of the linear motor 3 is sandwiched between the frame 4 and the locking member 12 of the cartridge holder 11 so that the linear motor 3 may be locked. Accordingly, the linear motor 3 is always locked and kept unmoved at the time of ejection of the disc cartridge 10.

When the disc cartridge 10 is loaded in the disc unit 1, the cartridge holder 11 moves backwards inside the disc unit 1. Because the locking member 12 moves backwards at the same time, the linear motor 3 is released from its locked condition.

As is clear from the above, the locking mechanism according to the present invention never requires any specialized mechanism or any part for exclusive use because the linear motor is locked by making use of the cartridge holder. In other words, the number of parts is reduced and only the locking members of extremely simple construction are additionally provided in the unit. As a result, not only is the production cost reduced but troublesome management is hardly be required. Furthermore, when the disc cartridge is ejected from the unit, the linear motor is locked without fail. Accordingly, the linear motor is never left free and the optical pickup is prevented from being damaged by the movement of the linear motor.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A mechanism for locking a linear motor movably disposed in a disc unit which is internally provided with a cartridge holder for loading and ejecting a disc cartridge, said mechanism comprising:
    a first locking member extending downwardly from the cartridge holder; and
    a second locking member securely mounted on the linear motor;
    said first locking member, when the disc cartridge is ejected by the cartridge holder, is brought into contact with said second locking member to move the linear motor towards a location at which the linear motor is locked.

2. The mechanism according to claim 1, wherein a portion of said linear motor is sandwiched between a frame fixedly mounted in the disc unit and said first locking member in contact with said second member, when said linear motor is locked at said location.

* * * * *